United States Patent [19]
Solo

[11] 3,929,311
[45] *Dec. 30, 1975

[54] SUPPORTING FASTENER

[75] Inventor: Alan J. Solo, Brooklyn, N.Y.

[73] Assignee: Knock-N-Lok, Brooklyn, N.Y.

[ * ] Notice: The portion of the term of this patent subsequent to Sept. 30, 1992, has been disclaimed.

[22] Filed: May 14, 1974

[21] Appl. No.: 469,666

Related U.S. Application Data

[63] Continuation-in-part of Ser. No. 463,820, April 24, 1974, which is a continuation-in-part of Ser. No. 454,393, March 25, 1974.

[52] U.S. Cl. .................................. 248/217; 85/27
[51] Int. Cl.² ......................................... A47G 1/16
[58] Field of Search ..... 85/44, 3 R, 30, 5 P, DIG. 3, 85/27, 7; 248/217

[56] References Cited
UNITED STATES PATENTS

| 287,113 | 10/1883 | Ellithorp | 248/217 |
|---|---|---|---|
| 838,203 | 12/1906 | Neil | 85/27 |
| 900,318 | 10/1908 | Smith | 85/27 |
| 1,768,456 | 6/1930 | Smith | 85/3 R |
| 1,857,530 | 5/1932 | Dandridge | 85/21 |
| 2,266,892 | 12/1941 | Mullen | 85/30 |
| 2,408,366 | 10/1946 | Boyer | 85/3 R |

FOREIGN PATENTS OR APPLICATIONS

| 87,020 | 11/1920 | Switzerland | 248/217 |

Primary Examiner—Edward C. Allen
Attorney, Agent, or Firm—Friedman & Goodman, Esqs.

[57] ABSTRACT

A fastener is described for supporting an object or member on a surface of a penetrable material. The fastener includes an elongate shank which has converging surfaces at one end thereof to form a cutting edge suitable for being driven through the penetrable material. The shank is provided at the other end with a slotted head engageable with a screwdriver for turning the shank about its axis. The head is suitable for being hammered to advance the cutting edge and the shank through the penetrable material. An anchoring portion in the region of the cutting edge projects laterally of the shank in directions substantially normal to the axis of the latter to form an anchoring shoulder. Washers are described which have apertures dimensioned to permit passage of the shank and anchoring portion therethrough prior to entry of the fastener into the penetrable material. Each washer is secured between the head of the fastener and the penetrated surface and includes a tab projecting from and inclined relative to the plane of the respective washer. The tab is configurated to engage and support the member. The tabs may be elongate and hook shaped or may be T-shaped to be receivable within a keyhole slot provided in the member.

15 Claims, 17 Drawing Figures

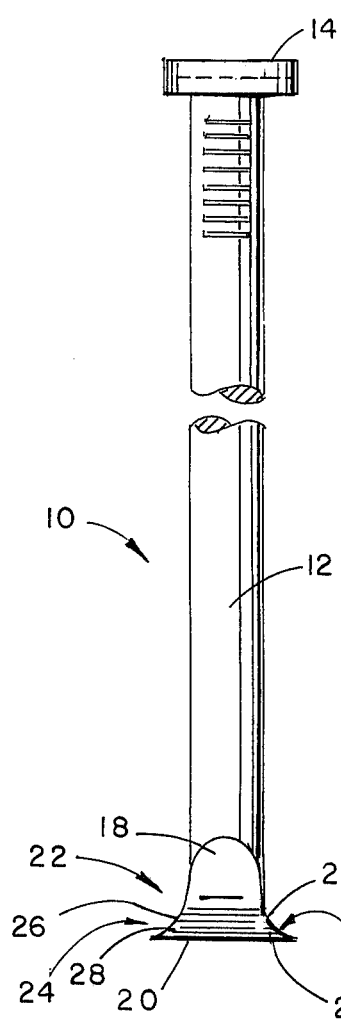
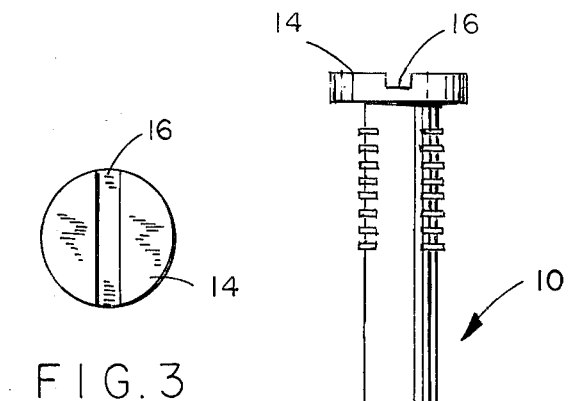
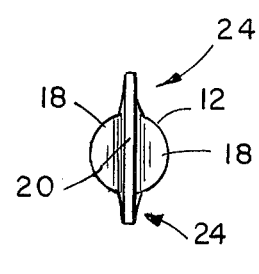
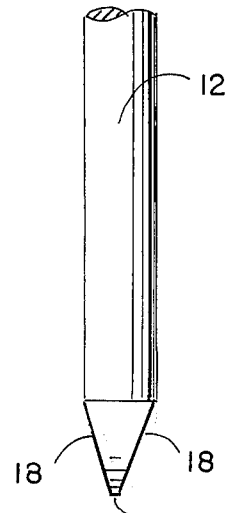
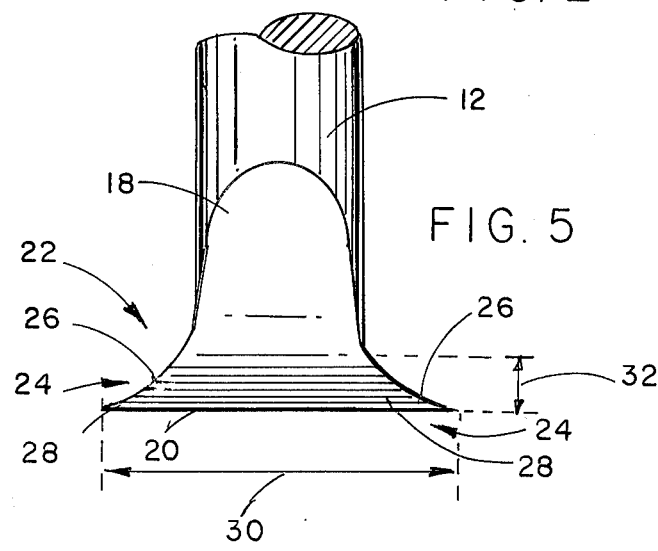

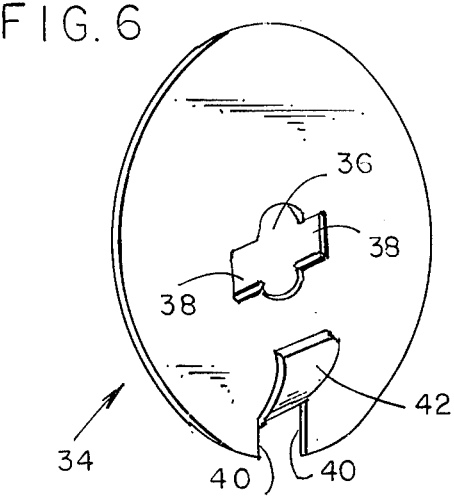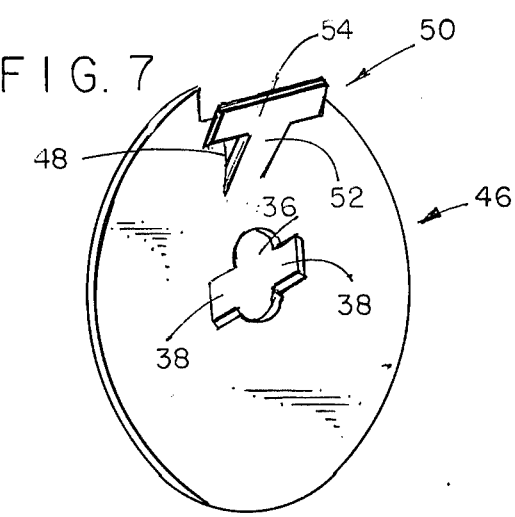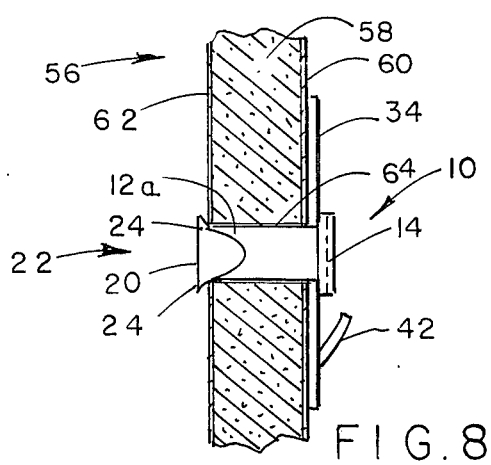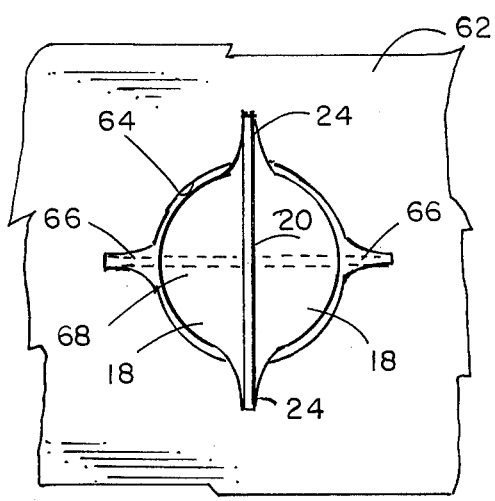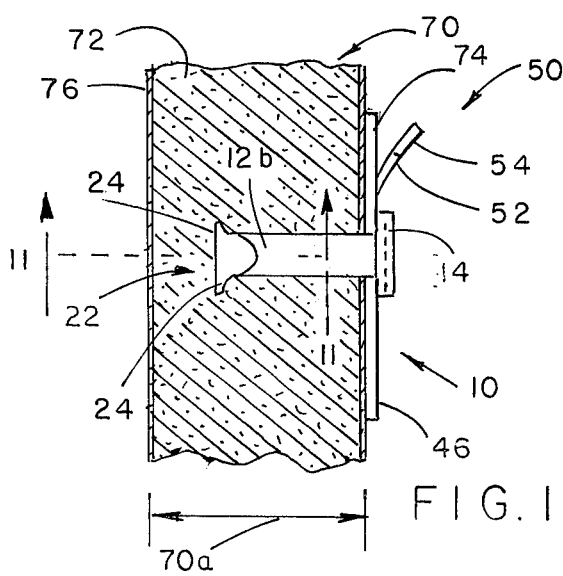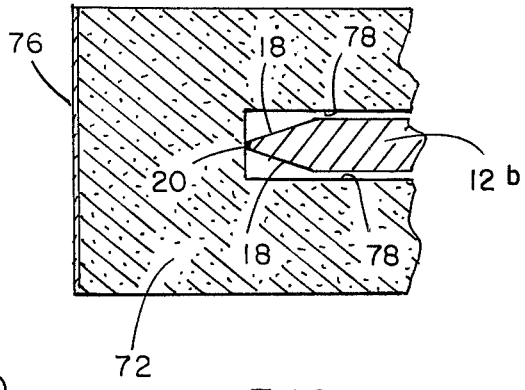

SUPPORTING FASTENER

CROSS REFERENCE TO RELATED APPLICATIONS

The present application is a continuation-in-part application of application Ser. No. 463,820, filed Apr. 24, 1974, for "LOCKABLE FASTENER," the latter application being a continuation-in-part application of application Ser. No. 454,393, filed Mar. 25, 1974, for "WOOD ANCHORING NAIL."

BACKGROUND OF THE INVENTION

The present invention generally relates to fasteners, and particularly to a supporting fastener which can be driven into a penetrable material and which can support picture frames, members provided with keyhole slots, and the like.

Various fasteners and mounting means are known for hanging or supporting objects on a surface of a wall. Prior art devices commonly used for this purpose exhibit disadvantages, particularly when the wall on which an object is to be supported is soft and brittle, such as plaster walls or plaster board sheets. A simple nail driven into such a soft surface penetrates the surface but is not adequately retained therein. Similarly, screws which are advanced into soft walls of this type are not adequately retained therein. Accordingly, hooks or the like which are intended to be fixed against the surface of the wall by the nail or screw are not adequately secured for purposes of supporting objects on the wall.

One way to increase the retention of fasteners in soft and brittle walls is to drill holes through the wall and dispose therein expansion anchors of various types, including expansion anchors into which a screw is advanced to cause the anchors to expand against the plaster or other penetrable material. Butterfly anchors and similar devices have also been used to solve the above problem. With the latter type of anchors, these are normally passed through a hole drilled in the wall and expanded on the other side thereof to engage the opposing surface. However, the improved retaining power of these last mentioned anchors is achieved at the expense of additonal time and effort which must be expanded in first drilling holes in the surface. Many of the known anchors are not easily removable. Accordingly, these anchors can only be used once and considerable effort is often required to remove the same.

The present invention overcomes the above described disadvantages by utilizing a wood anchoring nail having anchoring shoulders at the driving cutting edge thereof, as disclosed in the original application Ser. No. 454,393, which can be driven through a penetrable material without having to first drill a hole. A washer provided with an engaging tab is placed on the shank of the nail prior to being driven into the penetrable surface. Once the anchoring portion of the nail is driven through the penetrable material, engagement of the head and turning of the same brings the anchoring shoulders of the anchoring portion of the nail against the wall material and locks the nail in place.

SUMMARY OF THE INVENTION

Accordingly, it is an object of the present invention to provide a supporting fastener which does not have the above described disadvantages of comparable fasteners known in the art.

It is another object of the present invention to provide a supporting fastener of the type under discussion which is simple in construction and economical to manufacture.

It is still another object of the present invention to provide a supporting fastener which can be driven into a penetrable surface and includes a hook suitable for hanging picture frames.

It is yet another object of the present invention to provide a supporting fastener which can be driven into a penetrable material and includes a T-shaped tab suitable for being received within a keyhole slot provided in an object to be supported.

It is a further object of the present invention to provide a supporting fastener of the type suggested in the other objects including a shank having a cutting edge at one end suitable for being driven into a penetrable material, the shank having a length comparable to the thickness of the material through which the shank is to be driven, whereby turning of the anchor after the cutting edge has been brought to the opposing surface causes anchoring portions to engage the opposing surfaces to lock the anchor in place.

In order to achieve the above objects, as well as others which will become apparent hereafter, a fastener for supporting a member on a surface of a penetrable material includes an elongate shank. Said shank has converging surfaces at one end thereof to form a cutting edge suitable for being driven through the penetrable material. An engagable head is provided at the other end of said shank suitable for being hammered to advance said cutting edge and said shank through the penetrable material and for being engaged to permit turning of said shank about the axis thereof. An anchoring portion is provided within the region of said cutting edge which projects laterally of said shank in a direction substantially normal to the axial length of the latter to form an anchoring shoulder. Support means is provided which is apertured to permit passage of said anchoring portion and said shank therethrough prior to entry of the fastener into the penetrable material. Said support means is fixed in position between said head and the surface of the penetrable material in the fully driven and turned position of said shank and anchoring portion. Said support means includes engaging means for engaging a corresponding portion of a member to be supported. In this manner, driving said shank into said penetrable material and turning the same about the axis thereof by engaging said head fixes the fastener in place and secures the member to the surface of the penetrable material.

In the presently preferred embodiment, said support means comprises a planar washer having an aperture diimension to permit passage of said anchoring portion and said shank therethrough and prevent passage of said head. Said washer is provided with a tab projecting from the plane of said sheet and spaced from said aperture. Said tab is inclined relative to the plane of said washer and configurated in the shape of a hook to engage and support the member. Such a tab may be used to support a picture frame. When the tab is T-shaped, it can be passed through a keyhole slot in a member to be supported and be captured within said slot.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a fragmented front elevational view of a nail forming part of the supporting fastener in accordance with the present invention;

FIG. 2 is a fragmented side elevational view of the nail shown in FIG. 1;

FIG. 3 is a top plan view of the nail shown in FIG. 1;

FIG. 4 is a bottom view of the lower end of the nail shown in FIG. 1;

FIG. 5 is an enlarged fragmented view of the lower end of the nail shown in FIG. 1, showing the details of the anchoring means which is suitable for use in penetrable materials;

FIG. 6 is a perspective view of a picture frame hook washer which cooperates with the nail shown in FIGS. 1–5 to form the supporting fastener in accordance with the present invention;

FIG. 7 is similar to FIG. 6, but showing a keyhole slot hook washer which is suitable for use in conjunction with the nail shown in FIG. 1–5 for supporting members provided with keyhole slots;

FIG. 8 is a cross section through a plaster board sheet, showing the picture frame hook washer of FIG. 6 supported by a nail similar to that shown in FIGS. 1–5 and having a length corresponding to the thickness of the plaster board sheet;

FIG. 9 is an enlarged rear elevational view of the driven and anchored nail shown in FIG. 8, showing, in dashed outline, the original orientation of the nail when driven into the plaster board sheet and the orientation subsequent to rotation to lock the nail in place;

FIG. 10 is similar to FIG. 8, but showing the keyhole slot hook washer of FIG. 7 supported on a nail of the type shown in FIGS. 1–5 having a shank length smaller than the thickness of the penetrable material layer into which the nail is driven;

FIG. 11 is a cross section of FIG. 10, taken along line 11—11;

DESCRIPTION OF THE PREFERRED EMBODIMENTS

Figure 12:
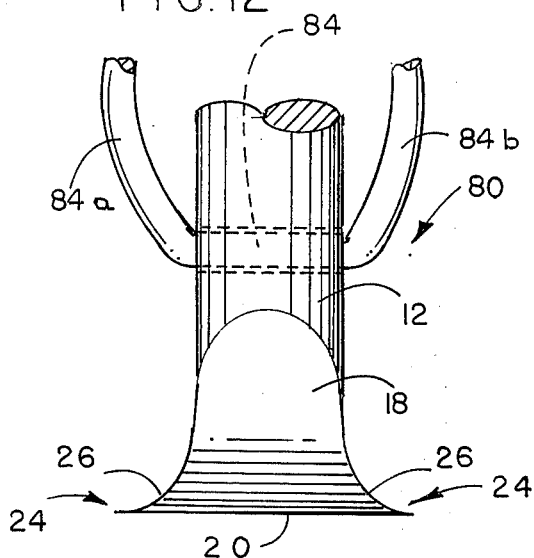
FIG. 12 is a fragmented front elevational view of a further embodiment of the nail shown in FIG. 1 particularly suitable for use in brittle materials such as plaster and plaster board.

The nail shown in FIGS. 1–5 is similar in construction to the anchoring nail disclosed in the parent application Ser. No. 454,393 and is generally designated by the reference numeral 10.

The anchor or fastener 10 is in the form of a nail which can be driven through a penetrable material, such as wood, plaster, plaster board or the like. The nail includes a cylindrical shank 12 which is provided at the upper end thereof, as viewed in FIGS. 1 and 2, with a flat head 14 provided with a slot 16 extending therethrough. With this arrangement, the nail may be turned about its axis by engagement of the slotted head with a suitable tool such as a screwdriver. However, the head 14 may assume any other shape or configuration which permits gripping or engagement thereof to turn the nail about its axis.

At the lower end of the shank 12, a viewed in FIGS. 1 and 2, the nail 10 is provided with converging surfaces 18 which form a cutting edge 20 suitable for being driven into a penetrable material such as wood, plaster, plaster board or the like.

An important feature of the present invention is the provision of an anchoring portion 22 in the region of the cutting edge 20 which projects laterally of the shank 12 to form diametrically opposing wings 24. The wings 24 extend in directions substantially normal to the axis of the shank to form anchoring shoulders 26 therewith which face in the direction of the head 14.

Each of the wings 24 includes a cutting surface 28 which can cut into a penetrable material when the anchoring portion 22 is turned while in the material, as described in the parent application. When used in this manner, the transverse dimension 30 is advantageously greater than the axial dimension 32 of the anchoring portion to facilitate turning of the nail by engagement of the head with a suitable tool, such as a screwdriver. When the anchoring portion 22 remains in the penetrable material, the shoulders 26 are advantageously made sufficiently large to assure good anchoring of the nail after being turned angularly about the axis thereof from the initial driven position. As shown in FIG. 5 of the drawings of the present invention, and as set forth in the parent application Ser. No. 454,393, the ratio of the dimension 32 to the dimension 30 is less than approximately 0.2, and the ratio of the diameter of the shank to the transverse dimension 30 is approximately 0.5.

The supporting fastener of the present invention utilizes the nail shown in FIGS. 1–5 for supporting objects or members on surfaces of penetrable materials. Supporting means, to be described, cooperate with the nail 10 and are in the form of planar sheets of material or washers having apertures dimensioned to permit passage of the anchoring portion 22 and the shank 12 while preventing passage of the head 14. Referring to FIG. 6, a washer of the type generally described in U.S. application Ser. No. 463,820 is shown having a central circular aperture 36 dimensioned to permit passage therethrough of the shank 12. A pair of diametrically opposing slots 38 extend laterally of the aperture and dimensioned to permit passage therethrough of the anchoring portion 22 when the latter is angularly aligned with the slots 38.

The washer 34 is in the form of a planar circular sheet of plate. However, the circular configuration is not critical. Similarly, the material from which the washer 35 is made is not critical, as long as the material is sufficiently strong to support the anticipated loads. For example, the washer 34 may be made from metal.

The washer 34 includes a tab 42 which projects from the plane of the washer and spaced from the aperture 36, the tab being inclined relative to the plane of the washer and configurated in the form of a hook to engage and support a member to be hung. The washer 34 is particularly suitable for hanging picture frames, wherein the strand or wire attached to the frame is supported by the tab or hook 42. When the washer 34 is made from a material which can be punched or otherwise cut, opposing edges 40 may be formed to define the tab 42. The circular aperture 36, while dimensioned to permit passage therethrough of the shank 12, is dimensioned to prevent passage of the head 14 of the nail 10. In this manner, the nail 10 can retain the washer 34 in a fixed and supporting condition after being driven into a penetrable material and locked therein, as to be described.

In FIG. 7, a keyhole slot hook washer 46 is shown which is similar to the picture frame hook washer 34 with the exception that the edges 40 are replaced by a T-shaped edge 48 which forms a T-shaped tab 50. The tab 50 is commonly known as a keyhole tab and includes a radial portion 52 and a transverse portion 54.

While the picture frame washer 34 has the tab 42 disposed at the periphery thereof and projects in the direction of the aperture 36, the tab 50 projects in a direction away from the aperture 36. The tab 42 can support a picture frame thereon when the tab is disposed at a level below the head 14 and the washer is secured in place to the penetrable material as shown in FIG. 8. On the other hand, the T-shaped tab is dimensioned to permit passage through a keyhole slot in a member to be supported when the tab is disposed either above the aperture 36, as shown in FIG. 10 in solid outline, or below, as shown in dashed outline.

An important advantage of the present invention, as suggested above, is that the fasteners may be secured to the supporting walls in a simple manner without drilling holes. This is true for most penetrable materials. However, in the case of plaster board sheets or the like having coverings on opposing surfaces such as cardboard, the cutting edge may excessively damage the cardboard and adjacent plaster on the opposing side of the sheet when the edge penetrates therethrough. This weakens the opposing surface which no longer exhibits a rigid surface against which the anchoring shoulders 26 can abut to provide the anchoring action, as to be described, when the nail 10 is turned. Accordingly, in plaster boards and the like, it may be advantageous to first drill a hole in the plaster board corresponding to the dimensions of the shank 12 to prevent damage to the opposing surface. This has been found to materially increase the retaining action of the anchors in such materials.

Referring to FIGS. 8 and 9, a plaster borad sheet 56 is shown having a central plaster section 58 and opposing paper or cardboard coverings 60 and 62. The thickness of the sheet is designated by the reference numeral 56a. One way of utilizing the anchors of the present invention is to select the shank 12a thereof to have a length corresponding to the thickness of 56a. In this manner, once the anchoring portion 22 and the shank 12a are passed through the apertures 36, 38, the head 14 may be hammered through the surface 60 to drive the anchoring portion 22 and the shank 12a through the plaster board 56 to bring the wings 24 to the opposing covering surface 62. While the nail 10 is so hammered, a hole 64 is formed which substantially corresponds to the diameter of the shank 12. As explained above, the hole 64 may be pre-drilled to prevent ripping of the covering 62 and to improve anchoring action in the board 56. A pair of diametrically opposing grooves 66 are similarly formed by the advancing wings 24. The reference numeral 68 indicates the original orientation of the cutting edge 20 during the driving of the nail through the plaster board. Once the nail has been fully driven through the plaster board, the head 14 is engaged such as by placing a screwdriver within the slot 16 and turning the nail 10 about its axis. In FIG. 9, the nail has been shown to be turned approximately 90°. Once the wings 24 are angularly turned out of alignment with the grooves 66, the anchoring shoulders 26 are disposed in abutting relationship against the surface of the covering 62 to thereby lock the nail 10 in place and securely fix the position of the picture frame washer 34.

According to an important feature of the present invention, the slot 16 in the head is aligned or parallel to the cutting edge 20. This provides a visual indication to an observer on the side facing the covering 60 of the angular disposition of the cutting edge 20 and the location of the anchoring shoulders 26. This facilitates removal of the nail 10 if the nails are driven consistently in one preselected orientation of the cutting edge 20 and/or slot 16 on the head.

Where the length of the shank 12a is greater than the length 56a, it is possible to build up the distance between the head 14 and the anchoring shoulders 24 by mounting washers at one end of the nail or the other, as shown and described in application Ser. No. 463,820. However, by selecting the length of the shank 12a to correspond to standard thicknesses 56a of plaster board, the use of additional washers or spacers can thereby be obviated.

Referring to FIGS. 10 and 11, a plaster board sheet 70 is shown which has a thickness 70a and which includes a central plaster section 72 and opposing paper or cardboard coverings 74 and 76. Here, the length of the shank 12b is less than the thickness 70a. In this instance, anchoring is achieved by driving the nail 10 into the plaster board 70 and turning the nail in the fully driven position shown. The final anchored position is shown in FIGS. 10 and 11. When the anchor is driven through the plaster section 72, the wings 74 generate elongate slots or grooves 78, best shown in FIG. 11. To facilitate turning the nail with the anchoring portion 22 within the plaster, the axial dimension 32 is advantageously substantially less than the transverse dimension 30. This is more fully described in the U.S. application Ser. No. 454,393.

The T-shaped tab 50 may be inserted into a keyhole slot with the tab in an upper position above the aperture 36 or it may be inserted into the keyhole slot in the lower position of the tab, as suggested by the dashed outline in FIG. 7.

What has been described above is a supporting fastener which can be driven into a penetrable material without the need to first drill holes therethrough. The fasteners are suitable for supporting loads of various types upon a wall surface, such as picture frames, cabinets provided with keyhole slots and other common objects hung on walls which have portions engageable with a tab on the supporting washer. While a rectangular tab 42 and a T-shaped tab 50 have been described, it should be clear that the specific configuration of the tab is not critical and that the washers may be formed in different ways to support different structures or objects. Another advantageous feature of the supporting fastener of the present invention is that, unlike prior art fasteners of this type, it can be removed from the wall as easily as it is driven into the wall. Subsequent to removal, the fastener is capable of being re-used in the same or another surface. A still further advantage of the present supporting fastener is that it can be utilized in penetrable materials having various thicknesses, whether these be standard or otherwise. With standard thickness walls, suitable shank lengths may be selected which permit turning of the nail in a very simple manner once the anchoring portion has surfaced at the other or opposing side of the wall. However, where thick walls are involved, the supporting fastener is equally useful due to the particular configuration of the anchoring portion, as described above and specifically described in U.S. application Ser. No. 454,393.

As suggested above, the use of the anchors of the type above described in brittle penetrable materials, such as plaster board or the like, may result in at least partial destruction of the retaining surfaces which abut against the nail after the latter is driven through the material. As described above, once the nail is turned about its axis to bring the anchoring shoulders 26 thereof into abutment against the opposing surface, or against a washer disposed on the shank, the anchor is retained satisfactorily for most purposes. However, because the nail and shank may be loosely held in such materials, it is possible for the shank to rotate about its axis to the original driven orientation wherein the anchoring wings 24 are again aligned with the originally formed groove. This may result in undesirable axial movement of the nail along its axis. When a sufficiently strong axial force acts on the nail in this condition, it is possible for the nail to be fully withdrawn or pulled out of the plaster.

In order to improve the anchoring properties of the above described fastener in brittle penetrable materials, such as plaster board or the like, the present invention also contemplates the use of means, to be described, for securing the nail within the plaster board to inhibit both axial as well as angular movements of the nail about its axis.

Figure 13:
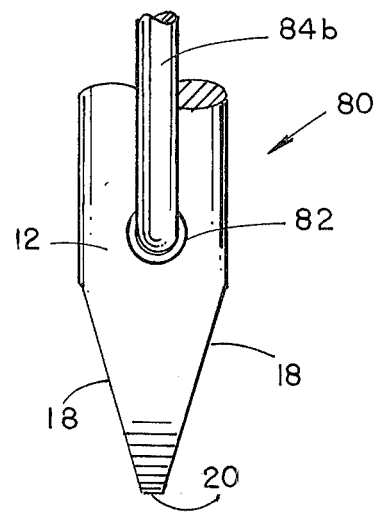
FIG. 13 is a side elevational view of the nail shown in FIG. 12.

Referring to FIGS. 12 and 13, a further embodiment of the nail is generally designated by the reference numeral 80 and it includes a transverse passageway in the form of a transverse hole 82 in the shank 12 which is parallel to the cutting edge 20. An elongated strand 84 extends through the hole 82 and includes two free ends 84a and 84b extending respectively on each side of the shank 12. The strad 84 may be made from any suitable elastomeric or synthetic resin material. For example, a strand made from a flexible plastic wire has been found suitable for this purpose. The strand 84 must be made from a sufficiently strong material so that it does not shear or tear when the nail is angularly turned within plaster, as to be described.

Figure 14:
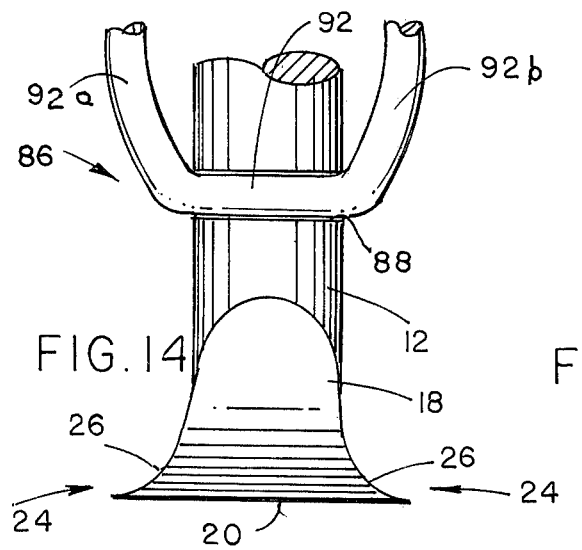
FIG. 14 is similar to FIG. 12 with the exception that the nail is provided with lateral slot instead of a transverse hole through the shank.
Figure 15:
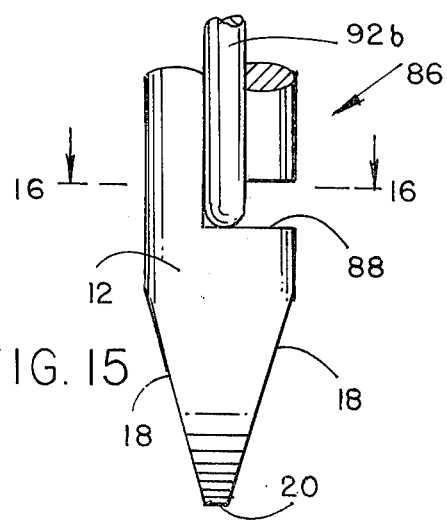
FIG. 15 is a side elevational view of the nail shown in FIG. 14.

In FIGS. 14 and 15, a modified nail 86 is shown which differs from the nail shown in FIGS. 12 and 13 in that a transverse groove or slot 88 is provided instead of the transverse hole 82. Both the transverse hole 82 and the groove 88 are passageways provided at the driving end of the shank 12 proximate to the cutting edge 20. As with the hole 82, the transverse groove or slot 88 is parallel to the cutting edge 20. An elongate strand 92 is similarly disposed within the slot or groove and includes projecting free ends 92a and 92b.

Figure 16:
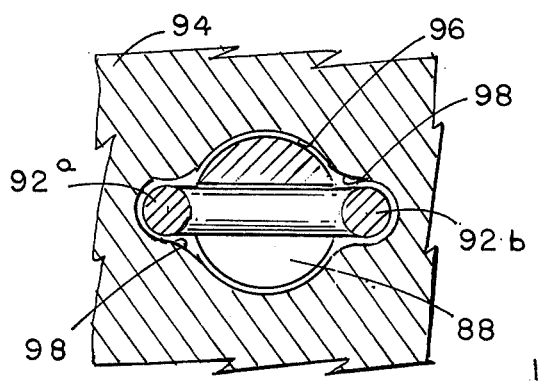
FIG. 16 is a cross section of the nail shown in FIG. 15 when the latter is driven through a brittle penetrable material such as plaster or plaster board, taken along line 16—16.

The manner of using the modified nails shown in FIGS. 12–15 will now be described in reference to FIGS. 16 and 17. In FIG. 16, the nail of FIGS. 14 and 15 is shoown subsequent to being driven into a brittle penetrable material such as plaster or plaster board. The plaster board section 94 has a substantially cylindrical hole 96, which may have been pre-drilled as described above. While the nail is driven into the plaster board, the diameter of the pre-drilled hole may be somewhat enlarged due to the disintegration of the brittle material during the driving process. The plaster section 94 now also exhibits grooves or slots 98, diametrically opposed, which are formed by the advancing wings 24. An important feature of the present invention is that the grooves or channels 98 formed by the nail are suitable for receiving the free ends 92a and 92b of the strand 92. This is made possible by disposing the slot or groove 88 in a position substantially parallel to the cutting edge 20 wherein the free ends 92a and 92b are disposed axially rearwardly of the wings 24. In this manner, the nail may be driven into the material and the free ends 92a and 92b respectively received within the newly formed channels 98 without suffering any damage during the driving process. Once the nail reaches its fully driven position, the nail is twisted about its axis as above described. The manner in which the strands function to improve the anchoring characteristics will be described in connection with FIG. 17.

Figure 17:
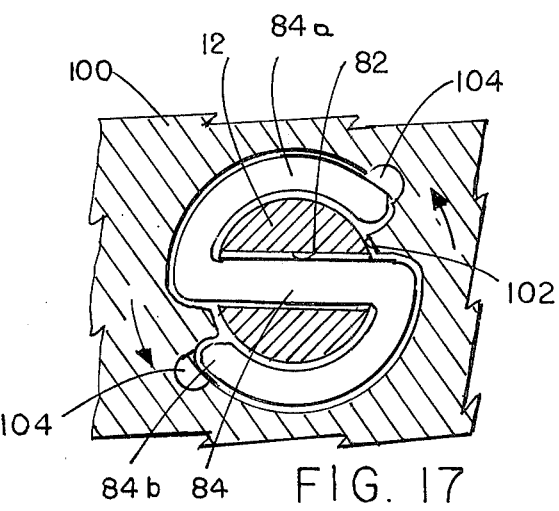
FIG. 17 is a cross section, similar to FIG. 16, of the nail shown in FIGS. 12 and 13, showing the wire or strand extending through the transverse hole twisted around the shank in response to turning of the nail about the axis thereof.

In FIG. 17, a brittle penetrable material 100, such as plaster board, is similarly provided with a substantially cylindrical hole 102 and diametrically opposite channels or grooves 104. The dimensions of the hole 102 and the enlargements 104 are similar to those described in connection with FIG. 16.

When the nail is turned about its axis, the captured portion of the strand 84 within the hole 82 is similarly turned. This draws the free ends 84a and 84b into the narrow clearance which is formed between the surface of the hole 102 and the outer surface of the shank 12. Since the strands are advantageously elastic, these become somewhat compressed as they are drawn into this small clearance. However, the soft and brittle plaster may be somewhat further disintegrated by the twisted free ends to thereby enlarge the clearance, as shown in FIG. 17. The free end 84a and 84b are received within the now larger clearance in a state of compression.

The use of strands such as strand 84 and 92 permit the shank of the nail to be secured in place due to the expansive actions of the free ends of the strands between the plaster board material and the shank. This secures the nail within such brittle materials both axially as well as angularly, the latter action preventing undesirable turning of the shank and reversion of the same into the aligned condition of the wings 24 and the grooves or channels formed by these wings.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A fastener for supporting a member on a surface of a penetrable material, said fastener comprising an elongate generally round shank, said shank having converging surfaces at one end thereof to form a cutting edge suitable for being driven through the penetrable material; an engageable head at the other end of said shank suitable for being hammered to advance said cutting edge and said shank through the penetrable material and for being engaged to permit turning of said shank about axis thereof; an anchoring portion in region of said cutting edge which projects laterally of said shank along a direction substantially normal to axial length of said shank to form therewith anchoring shoulders on diametrically opposing sides of said shank, said shoulders tapering from a major portion of said shank to form concave surfaces facing in the general direction of said head and merging with said cutting edge to form a point at each end thereof, said anchoring portion having a maximum transverse dimension and a maximum axial dimension, the ratio of said axial dimension to said transverse dimension being less than approximately 0.2, and the ratio of the diameter of said shank to said transverse dimension being approximately 0.5, said converging surfaces on said anchoring portion providing cutting surfaces sufficiently small to facilitate turning of said fastener after being driven into the penetrable material by engagement of said head with a suitable tool; said shoulders being sufficiently large to assure good anchoring of said fastener in the driven position due to engagement of said shoulders with the penetrable material after said fastener is turned angularly about its axis relative to initial driven position; support means apertured to permit passage of said anchoring portion and said shank therethrough prior to entry of the fastener into the penetrable material, said support means being fixed in position between said head and a surface of the penetrable material in fully driven and turned position of said shank and anchoring portion, said supporting means including engaging means for engaging a corresponding portion of a member to be supported, whereby driving said shank into the penetrable material and turning the same about the axis thereof by engaging said head fixes the fastener in place and secures the member to the surface of the penetrable material; said support means further including a planar sheet of material having an aperture dimensioned to permit passage of said anchoring portion and said shank therethrough and prevent passage of said head, said engaging means including a tab projecting from a plane of said sheet and spaced from said aperture, said tab being inclined relative to the plane of said sheet and configured to engage and support the member.

2. A fastener as defined in claim 1, wherein said engageable head is provided with a transverse slot suitable for being engaged by a screwdriver.

3. A fastener as defined in claim 1, wherein the penetrable material is in the form of a planar sheet having a predetermined thickness and wherein the length of said shank is substantially equal to said predetermined thickness, whereby fully driving said shank through one surface of said sheet and angularly turning said shank brings said anchoring shoulder into abutment against an opposing surface of said sheet to thereby fix the position of said shank and said support means.

4. A fastener as defined in claim 1, wherein said support means comprises a metallic washer.

5. A fastener as defined in claim 1, wherein said aperture is circular to correspond to the dimensions of said shank and is provided with an enlargment on the periphery of said circular aperture to permit passage of said anchoring portion therethrough in an axially aligned condition of said aperture and said anchoring portion.

6. A fastener as defined in claim 1, wherein said support means comprises a substantially flat washer having an aperture at the center thereof, said tab being disposed at the periphery of said washer and projecting in the direction of said aperture to form a hook, whereby said washer can support a member on said tab when the latter is disposed at a level below said head and said washer is secured in place on the penetrable material.

7. A fastener as defined in claim 6, wherein said tab is punched out of a peripheral portion of said washer.

8. A fastener as defined in claim 1, wherein said support means comprises a substantially flat washer having an aperture at the center thereof, said tab projecting in a direction away from said aperture and being T-shaped to permit passage through a keyhole slot in a member to be supported and captured within said slot, whereby said T-shaped tab can be inserted into a keyhole slot of the member when said tab is disposed either above or below said head and said washer is secured in place on the penetrable material.

9. A fastener as defined in claim 8, wherein said T-shaped tab is punched out of a portion of said washer.

10. A fastener for supporting a member on a surface of a penetrable material, said fastener comprising an elongate generally round shank, said shank having converging surfaces at one end thereof to form a cutting edge suitable for being driven through the penetrable material; an engageable head at the other end of said shank suitable for being hammered to advance said cutting edge and said shank through the penetrable material and for being engaged to permit turning of said shank about axis thereof; an anchoring portion in region of said cutting edge which projects laterally of said shank along a direction substantially normal to axial length of said shank to form therewith anchoring shoulders on diametrically opposing sides of said shank, said shoulders tapering from a major portion of said shank to form concave surfaces facing in the general direction of said head and merging with said cutting edge to form a point at each end thereof, said anchoring portion having a maximum transverse dimension and a maximum axial dimension, the ratio of said axial dimension to said transverse dimension being less than approximately 0.2, and the ratio of the diameter of said shank to said transverse dimension being approximately 0.5, said converging surfaces on said anchoring portion providing cutting surfaces sufficiently small to facilitate turning of said fastener after being driven into the penetrable material by engagement of said head with a suitable tool; said shoulders being sufficiently large to assure good anchoring of said fastener in the driven position due to engagement of said shoulders with the penetrable material after said fastener is turned angularly about its axis relative to initial driven position; support means apertured to permit passage of said anchoring portion and said shank therethrough prior to entry of the fastener into the penetrable material, said support means being fixed in position between said head and a surface of the penetrable material in fully driven and turned position of said shank and anchoring portion, said support means including engaging means for engaging a corresponding portion of a member to be supported, whereby driving said shank into the penetrable material and turning the same about the axis thereof by engaging said head fixes the fastener in place and secures the member to the surface of the penetrable material; said shank being provided with a transverse passageway extending through said shank and oriented in a direction substantially parallel to said cutting edge; and elongate flexible means at least partially receivable within said passageway and having free end portions projecting beyong the same, whereby said free ends are drawn into grooves formed by said anchoring portion when the latter is driven into the material and turning of said shank causes said free ends to become twisted about said shank in a state of compression between the latter and the material to inhibit movement of said shank.

11. A fastener as defined in claim 1, wherein said engageable head is provided with a transverse slot suitable for being engaged by a screwdriver, said slot being aligned with and parallel to said cutting edge.

12. A fastener as defined in claim 1, wherein said support means comprises a planar sheet of material having an aperture dimensioned to permit passage of said anchoring portion and said shank therethrough and prevent passage of said head, said sheet being provided with a tab projecting from the plane of said sheet and spaced from said aperture, said tab being inclined relative to the plane of said sheet and configured to engage and support the member.

13. A fastener as defined in claim 10, wherein said passageway is a transverse hole formed in said shank.

14. A fastener as defined in claim 10, wherein said passageway is a transverse grooved formed on a side of said shank.

15. A fastener as defined in claim 10, wherein said elongate flexible means comprises a length of flexible synthetic resin.

* * * * *